United States Patent
Stamey, Jr. et al.

(10) Patent No.: US 9,468,870 B2
(45) Date of Patent: Oct. 18, 2016

(54) FLUID FILTER ELEMENT

(71) Applicant: Wix Filtration Corp LLC, Gastonia, NC (US)

(72) Inventors: Willie L. Stamey, Jr., Kings Mountain, NC (US); Mark A. Roll, Bessemer City, NC (US)

(73) Assignee: Affinia Group Inc., Gastonia, NC (US)

( * ) Notice: Subject to any disclaimer, the term of this patent is extended or adjusted under 35 U.S.C. 154(b) by 0 days.

(21) Appl. No.: 14/102,070

(22) Filed: Dec. 10, 2013

(65) Prior Publication Data

US 2014/0166570 A1    Jun. 19, 2014

Related U.S. Application Data

(63) Continuation of application No. 12/416,758, filed on Apr. 1, 2009, now Pat. No. 8,603,334, which is a continuation of application No. 11/113,051, filed on Apr. 25, 2005, now Pat. No. 7,531,090.

(51) Int. Cl.
*B01D 35/153*    (2006.01)
*B01D 29/11*     (2006.01)

(52) U.S. Cl.
CPC .............. *B01D 29/11* (2013.01); *B01D 35/153* (2013.01); *B01D 2201/0415* (2013.01); *B01D 2201/305* (2013.01); *B01D 2201/316* (2013.01); *B01D 2201/4046* (2013.01)

(58) Field of Classification Search
CPC .............. B01D 35/153; B01D 35/157; B01D 2201/167; B01D 29/11; B01D 2201/0415; B01D 2201/305; B01D 2201/316; B01D 2201/4046

USPC .................................. 210/234, 235, 443, 457
See application file for complete search history.

(56) References Cited

U.S. PATENT DOCUMENTS

| | | | | |
|---|---|---|---|---|
| 2,339,703 A | * | 1/1944 | Kamrath | 210/457 |
| 2,946,449 A | * | 7/1960 | Shaw | 210/484 |
| 3,040,894 A | | 6/1962 | Pall | |

(Continued)

FOREIGN PATENT DOCUMENTS

EP    769317 A1 *    4/1997

OTHER PUBLICATIONS

Non-Final Office Action issued by the U.S. Patent and Trademark Office dated Jul. 3, 2012, relating to U.S. Appl. No. 12/416,758.

(Continued)

*Primary Examiner* — Thomas M Lithgow
(74) *Attorney, Agent, or Firm* — Honigman Miller Schwartz and Cohn LLP

(57) ABSTRACT

A filter element is removably positionable within a filter housing that includes a standpipe extending therewithin and provided with a flow control valve. The filter element comprises a tubular filter media, a first end cap, a second end cap longitudinally spaced from the first end cap, and a center tube extending between the first and second end caps. The center tube has a substantially cylindrical body extending between opposite first and second ends of the center tube. The center tube has at least one inlet opening formed on the cylindrical body and a standpipe opening at the second end thereof adjacent to the second end cap through which the standpipe may be inserted longitudinally into the center tube. The center tube further has at least one actuator key provided to open the flow control valve of the standpipe.

14 Claims, 18 Drawing Sheets

(56) References Cited

U.S. PATENT DOCUMENTS

| | | | |
|---|---|---|---|
| 3,056,503 A | 10/1962 | Roosa | |
| 3,105,042 A | 9/1963 | Roosa | |
| 3,246,766 A * | 4/1966 | Pall | 210/457 |
| 3,368,679 A * | 2/1968 | Bozek | 210/90 |
| 3,592,766 A * | 7/1971 | Kudlaty | 210/232 |
| 4,536,291 A | 8/1985 | Hoffmann et al. | |
| 4,664,529 A | 5/1987 | Cavalli et al. | |
| 4,668,393 A | 5/1987 | Stone | |
| 4,692,245 A | 9/1987 | Church et al. | |
| 4,740,299 A | 4/1988 | Popoff et al. | |
| 4,997,555 A | 3/1991 | Church et al. | |
| 5,244,571 A | 9/1993 | Church et al. | |
| 5,362,389 A | 11/1994 | Hardison et al. | |
| 5,362,390 A | 11/1994 | Widenhoefer et al. | |
| 5,362,392 A | 11/1994 | Jensen | |
| 5,547,572 A | 8/1996 | Stone | |
| 5,622,623 A | 4/1997 | Stone | |
| 5,643,446 A | 7/1997 | Clausen et al. | |
| 5,645,718 A | 7/1997 | Hardison et al. | |
| 5,736,045 A * | 4/1998 | Bies et al. | 210/497.01 |
| 5,770,065 A | 6/1998 | Popoff et al. | |
| 5,814,215 A | 9/1998 | Bruss et al. | |
| 5,904,844 A | 5/1999 | Stone | |
| 5,958,230 A | 9/1999 | Pyle et al. | |
| 6,015,492 A | 1/2000 | Popoff et al. | |
| 6,053,334 A | 4/2000 | Popoff et al. | |
| 6,113,781 A | 9/2000 | Popoff et al. | |
| 6,171,491 B1 | 1/2001 | Popoff et al. | |
| 6,375,836 B1 * | 4/2002 | Yano et al. | 210/130 |
| 6,488,845 B1 | 12/2002 | Neufeld et al. | |
| 6,495,042 B1 | 12/2002 | Knight | |
| 6,555,000 B2 | 4/2003 | Knight | |
| 6,558,536 B2 | 5/2003 | Jainek et al. | |
| 6,572,768 B1 | 6/2003 | Cline et al. | |
| 6,579,448 B2 | 6/2003 | Dworatzek | |
| 6,797,168 B1 | 9/2004 | Knight | |
| 7,070,692 B2 | 7/2006 | Knight | |
| 7,163,623 B2 | 1/2007 | Knight | |
| 2003/0196939 A1 | 10/2003 | Binder et al. | |
| 2004/0069700 A1 | 4/2004 | Miller et al. | |
| 2004/0164017 A1 | 8/2004 | Knight | |
| 2006/0086652 A1 | 4/2006 | Knight | |

OTHER PUBLICATIONS

Non-Final Office Action issued by the U.S. Patent and Trademark Office dated Jan. 24, 2013, relating to U.S. Appl. No. 12/416,758.

* cited by examiner

FLUID FILTER ELEMENT

RELATED APPLICATIONS

This application is a continuation of U.S. patent application Ser. No. 12/416,758 filed on Apr. 1, 2009, which in turn was a continuation of U.S. application Ser. No. 11/113,051 filed on Apr. 25, 2005, which is now issued as U.S. Pat. No. 7,531,090, wherein the contents of the abovementioned applications are hereby incorporated by reference in their entirety.

BACKGROUND OF THE INVENTION

1. Field of the Invention

This invention relates to fluid filter assemblies in general, and, more particularly, to a fluid filter assembly including a replaceable, fluid filter element that actuates a flow control valve in a standpipe of a filter housing.

2. Description of the Prior Art

Many types of fluid filters are known in the prior art. A popular type of fluid filter construction is one that has a housing which encloses a replaceable filter element. Fluid, such as oil or fuel, is cleansed of impurities as it passes through filter media of the filter element. The filter media captures many of the impurities that are removed from the fluid. Other impurities collect on the surface of the media and fall downward into a bottom area of the filter housing from which they may be periodically removed through a drain valve.

Periodically the filter element must be replaced. Such periodic replacement ensures that the filter element will not become so loaded with impurities that fuel flow is restricted. Replacing the element also ensures that impurities are removed from fuel before it is delivered to other fuel system components such as fuel injection pumps and fuel injectors, where such contaminants may cause severe damage.

Changing filter elements may pose problems however. One common problem is that disturbance of the spent element during replacement may cause collected impurities to fall off the element. In some designs, these impurities may travel into the outlet of the filter housing. As a result these contaminants may reach the components downstream in the fuel system. Another problem with certain prior art fuel filter constructions is that changing the element may require a mechanic to have skin contact-with the fuel. It is desirable to minimize such contact when changing a filter element.

While known liquid filters have proven to be acceptable for various vehicular applications, such devices are nevertheless susceptible to improvements that may enhance their performance and cost. With this in mind, a need exists to develop improved fluid filter assembly that advance the art.

SUMMARY OF THE INVENTION

The present invention provides a new and improved fluid filter element removably positionable within a filter housing defining a filter chamber for the filter element.

The filter housing includes a standpipe extending within the filter chamber. The standpipe is provided with a flow control valve for selectively controlling fluid flow through the standpipe.

The filter element in accordance with the present invention comprises a tubular filter media circumscribing a central axis, a first end cap supporting the filter media at one end thereof, a second end cap longitudinally spaced from the first end cap and supporting the filter media at the opposite end thereof, and a center tube extending between the second end cap and the first end cap. The center tube has a substantially cylindrical body extending between opposite first and second ends of the center tube. The center tube also has at least one inlet opening formed on the cylindrical body and a standpipe opening at the second end thereof adjacent to the second end cap through which the standpipe may be inserted longitudinally into the center tube. Furthermore, the center tube includes at least one actuator key provided to actuate the flow control valve of the standpipe.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. For purposes of the following description, the terms "upper", "lower", "top", "bottom", "upward", "downward", "vertical", "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Specific dimensions and other physical characteristics relating to the embodiments disclosed herein are not to be considered as limiting, unless expressly stated otherwise.

Figure 1:
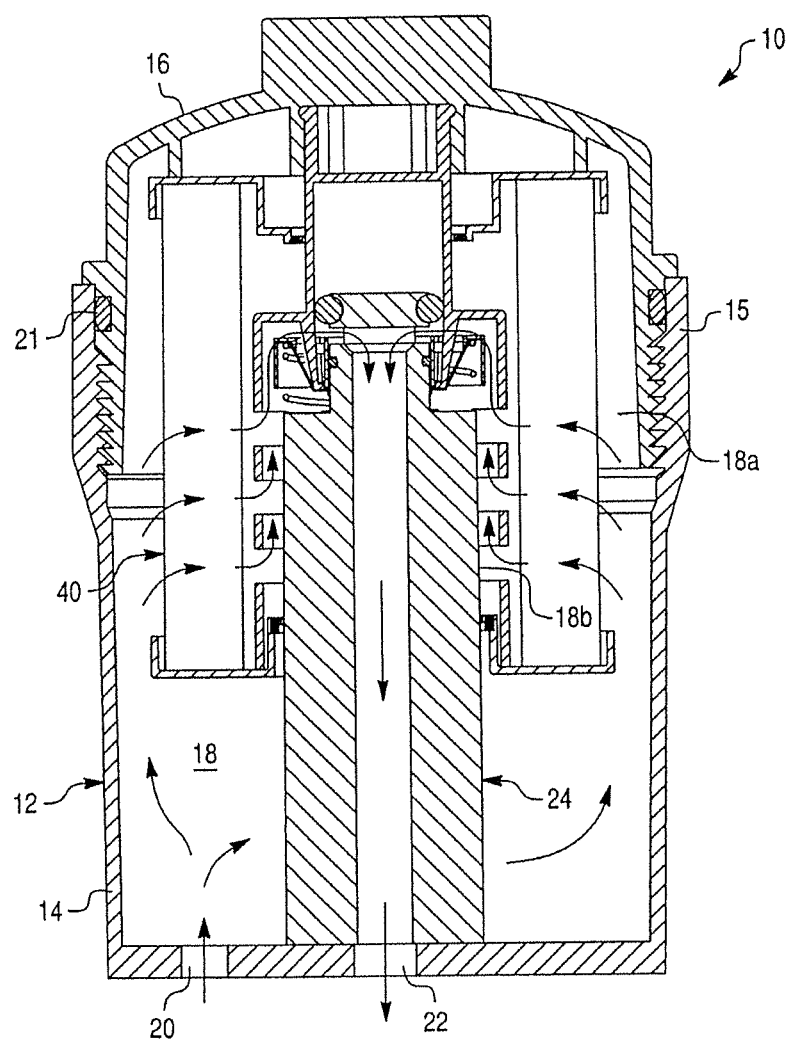
FIG. 1 is a cross-sectional view of a fuel filter assembly in accordance with a first exemplary embodiment of the present invention.

FIG. 1 depicts a fluid filter assembly 10 in accordance with the first exemplary embodiment of the present invention providing a radially outside-in flow pattern. The fluid filter assembly 10 comprises a filter housing 12 and a replaceable (or disposable) filter element 40 removably mounted within the filter housing 12, the combination of which provides the filter assembly 10. The filter assembly 10 can be useful for removing particulate and other contaminants from any type of fluid system. The present invention is particularly useful as a filter assembly for removing particulate and other contaminant from fuel such as internal combustion engine fuel in an engine fuel system in a motor vehicle.

Figure 2:
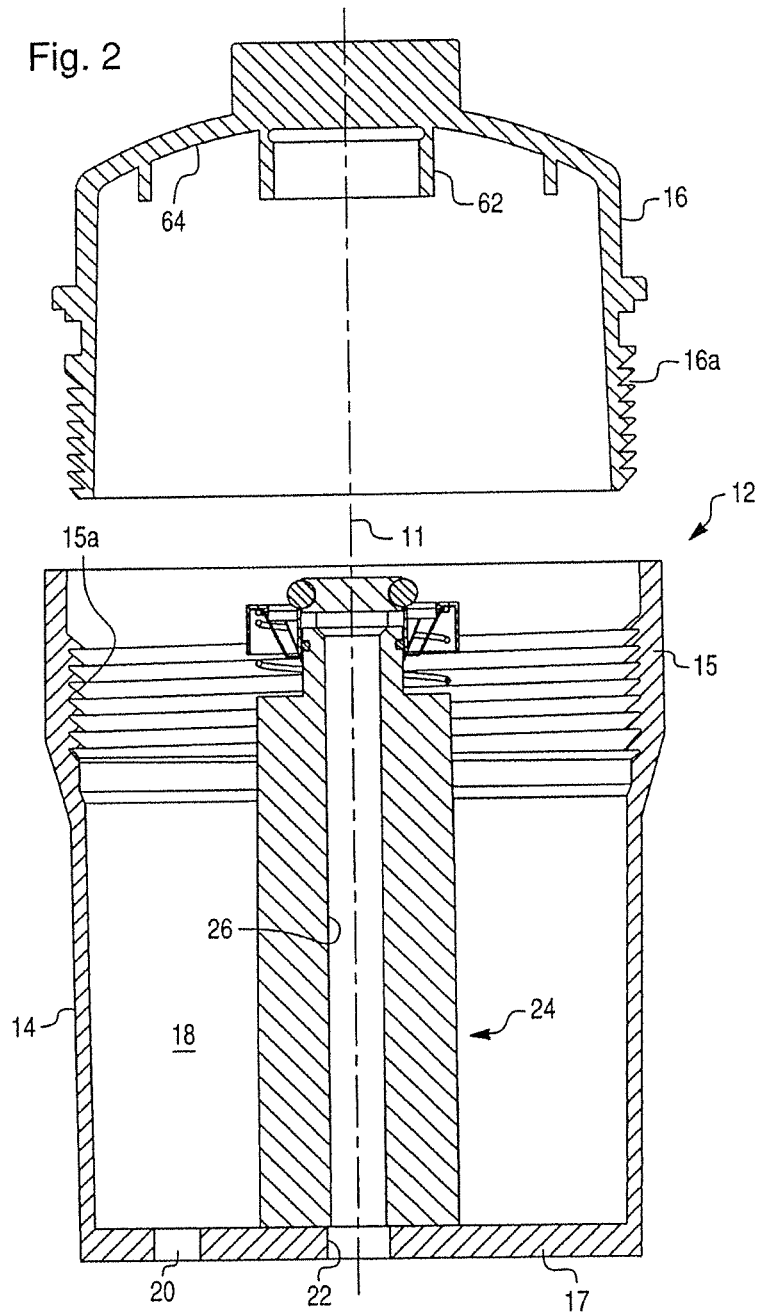
FIG. 2 is a cross-sectional view of a filter housing in accordance with the first exemplary embodiment of the present invention.
Figure 3:
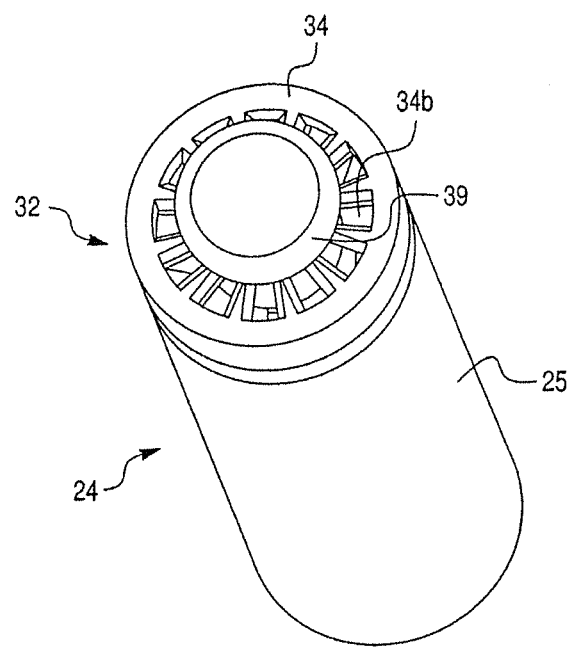
FIG. 3 is a perspective view of a standpipe with a flow control valve in accordance with the first exemplary embodiment of the present invention.
Figure 4:
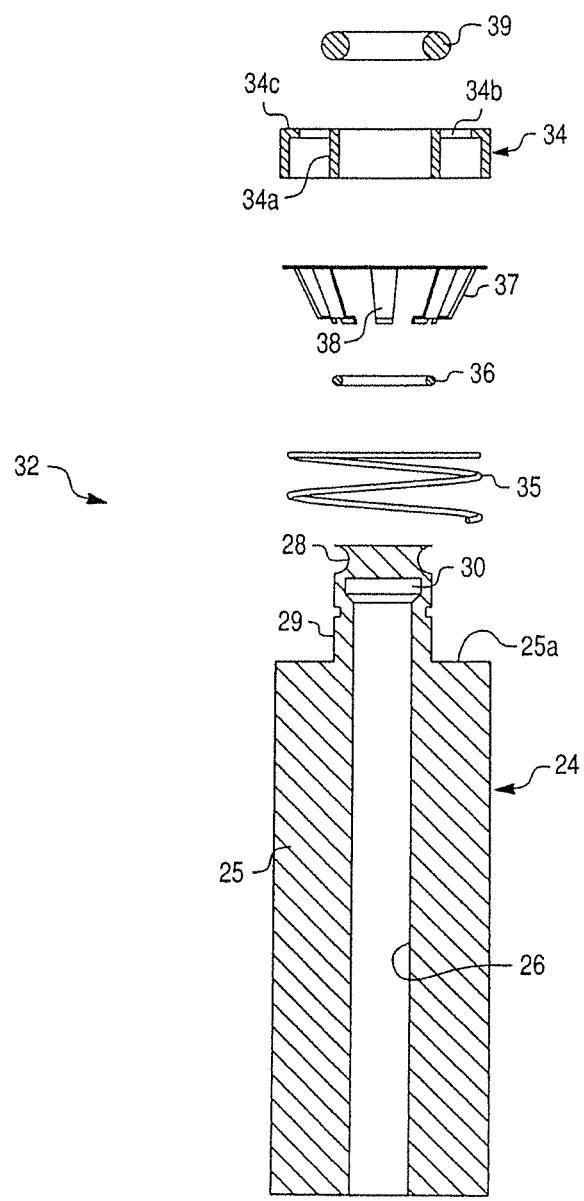
FIG. 4 is an exploded cross-sectional view of the standpipe with the flow control valve in accordance with the first exemplary embodiment of the present invention.
Figure 5:
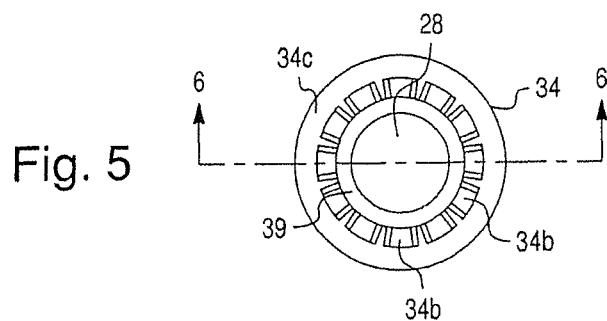
FIG. 5 is a top view of the standpipe with the flow control valve in accordance with the first exemplary embodiment of the present invention.
Figure 6:
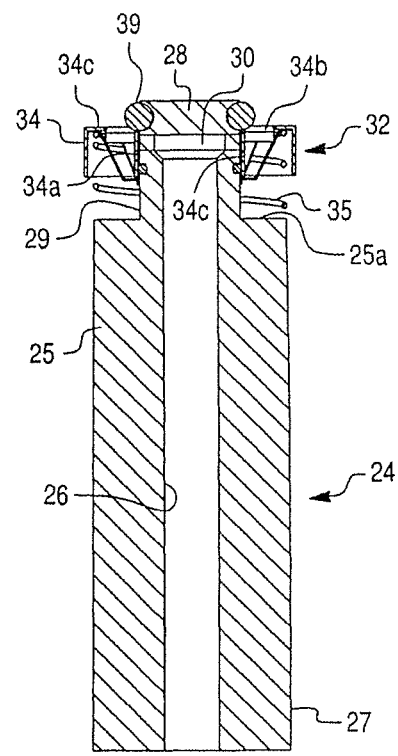
FIG. 6 is a cross-sectional view of the standpipe in accordance with the first exemplary embodiment of the present invention taken along lines 6-6 of FIG. 5 showing the flow control valve in a closed position.

The filter housing 12, further illustrated in detail in FIG. 2, is rather conventional and includes a cup-shaped (or annular) housing body 14 having a central axis 11 and projecting from a closed end 17 to a distal, open end 15, and a housing lid 16 removably attached to the housing body 14. Preferably, the lid 16 is threadedly attached to the housing body 14. The housing body 14 and the lid 16 are formed from materials appropriate for the particular application, such as metal or hard plastic. The filter housing 12, i.e. the housing body 14 and the lid 16, defines a filter chamber (an interior cavity) 18 into which the removable filter element 40 is mounted. Appropriate brackets and other attachment structure can be provided as necessary on the filter housing 12 to enable it to be fixed to an appropriate location in a support structure.

The filter housing 12 is provided with a fluid inlet port 20 and a fluid outlet port 22 which direct fuel into and out of the filter housing 12. The filter assembly 10 is described above as providing the radially outside-in flow pattern through the element 40, however it should be appreciated that the inlet and outlet to the filter assembly 10 could be reversed, and the filter element 40 could provide a radially inside-out flow pattern, if necessary or desirable for the particular application.

Fluid, such as oil or fuel, to be filtered is directed through the inlet port 20 and into a peripheral region of the filter chamber 18 of the filter assembly 10, between the housing body 14 and the filter element 40. The oil or fuel then passes radially inward through the filter element 40, where contaminants/particulate matters in the fuel are removed, and the filtered fluid then passes through the outlet port 22 to the downstream components of a lubrication or fuel system of the internal combustion engine (not shown). Thus, the filter housing 12 is adapted to be connected to the lubrication or fuel system of the internal combustion engine for receiving unfiltered oil or fuel via the inlet port 20 and returning filtered fluid back to the lubrication or fuel system via the outlet port 22.

The housing body 14 further includes a series of internal threads 15a are provided at the open end 15. The housing lid 16 also includes a series of external threads 16a provided near an open end thereof. The threads 15a of the housing body 14 cooperate with the threads 16a of the lid 16 to enable the lid 16 to be easily screwed onto and off of the housing body 14. An O-ring seal or gasket 21 is provided between the filter housing components, i.e. the housing body 14 and the lid 16, to provide a fluid-tight seal. The above is only one technique for attaching the lid 16 to the housing body 14, and other techniques are possible as should be known to those skilled in the art.

Referring now to FIGS. 1-7, a standpipe 24 extends vertically upward substantially coaxially to the central axis 11 of the filter housing 12.

The standpipe 24 includes substantially cylindrical standpipe body 25 having an internal flow passage 26 in fluid communication with the outlet port 22, and a flow control valve 32 adjacent to a distal end 28 of the standpipe body 25. The flow control valve 32 is provided for opening and closing the filter chamber 18 of the filter housing 12 to the outlet port 22 depending upon whether or not the filter element 40 has been properly mounted to the filter housing 12. The standpipe body 25 further includes one or more inlet openings 30 provided in a neck portion 29 of the standpipe body 25 formed the distal end 28 thereof in fluid communication with the internal flow passage 26 to allow filtered fluid to pass inward into the internal flow passage 26 of the standpipe 24. Preferably two inlet openings 30 are provided in the neck portion 29 of the standpipe body 25. An inner end 27 of the standpipe body 25 is sealingly secured to the closed end 17 of the housing body 14 by any appropriate means known in the art, such as by a threaded connection. The standpipe body 25 is formed of material, e.g. metal, such as aluminum, or hard plastic, appropriate for the particular application.

Figure 7:
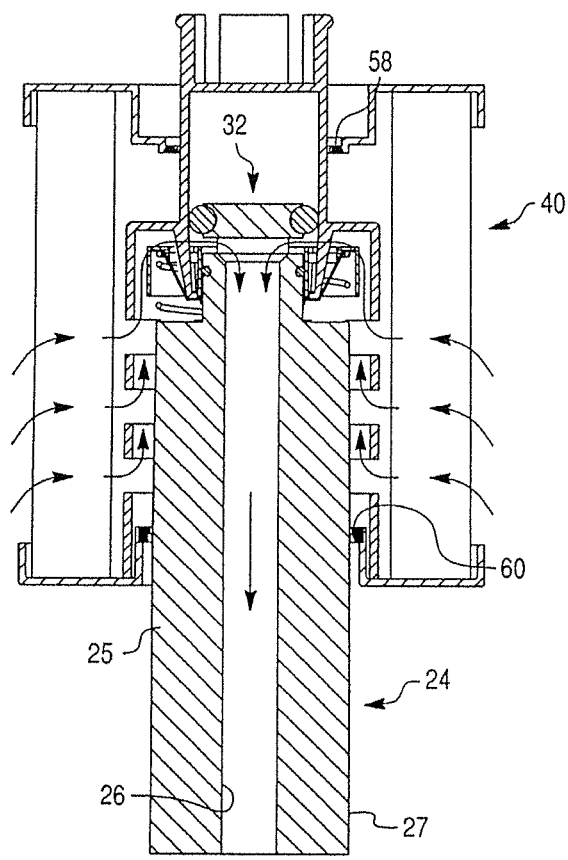
FIG. 7 is a cross-sectional view of the standpipe in accordance with the first exemplary embodiment of the present invention showing the flow control valve in an open position.

As illustrated in FIGS. 3-7, the flow control valve 32 includes a closure element 34 mounted for axial movement along the neck portion 29 of the standpipe body 25 between a closed (uppermost) position (shown in FIGS. 2, 3 and 6) and an open (lowermost) position (shown in FIGS. 1 and 7). The closure element 34 is normally biased by a spring 35 to the closed position for preventing fuel flow into the standpipe 24 through the inlet openings 30. The flow control valve 32 further includes an O-ring 36 for sealing the closure element 34 against the neck portion 29 of the standpipe body 25, an actuator ring 37 provided with a plurality of actuator arms 38, and a standpipe seal in the form of an O-ring 39. The actuator ring 37 is mounted about the neck portion 29 of the standpipe body 25 between the closure element 34 and the spring 35.

The flow control valve 32 is sized so that the closure element 34 is in close-fitting, movable relation with the neck portion 29 of the standpipe body 25 of the standpipe 24. The closure element 34 is thereby made axially movable about the neck portion 29 of the standpipe body 25. The spring 35 mounted about the neck portion 29 of the standpipe body 25 serves as biasing means for biasing the closure element 34 in the outward direction toward the distal end 28 of the standpipe body 25. The standpipe body 25 of the standpipe 24 has an annular shelf 25a against which one end of the coil spring 35 bears, while the other end of the coil spring 35 bears against the closure element 34 through the actuator ring 37 to hold the flow control valve 32 in the closed position.

As further illustrated in detail in FIGS. 4-7, the closure element 34 has a substantially cylindrical inner wall 34a slidingly engaging the neck portion 29 of the standpipe body 25, a plurality of actuator openings 34b in a top portion 34c thereof for receiving actuator keys of the filter element 40 that axially depresses the actuator ring 37 against the bias of the spring 35 to allow fluid flow through the inlet openings 30 past the closure element 34 and into the internal flow passage 26 of the standpipe 24.

The closure element 34, the standpipe 24 and the inlet openings 30 therein operate together as the flow control valve 32 to control fluid communication between the filter chamber 18 inside the filter housing 12 and the internal flow passage 26 of the standpipe 24. When the closure element 34 is disposed in its uppermost position (or closed) juxtaposed to the standpipe seal 39, as shown in FIG. 2, the cylindrical portion 34a of the closure element 34 is disposed adjacent and in blocking relation to the inlet openings 30. As a result, the flow control valve 32 is closed and the fluid flow into the standpipe 24 is blocked. However, when the closure element 34 is moved away from the standpipe seal 39 downward into its open position, the inlet openings 30 of the standpipe 24 are open, as shown in FIG. 1, which enables the fluid to be admitted to the internal flow passage 26 of the standpipe 24. Fluid flows into the internal flow passage 26 of the standpipe 24 through the inlet openings 30, and eventually passes to the fuel outlet port 22 of the filter assembly 10.

The replaceable filter element 40 is removably mounted in the filter chamber 18 of the filter housing 12. The filter element 40 according to the first exemplary embodiment of the present invention illustrated in detail in FIGS. 7-9, includes a ring of a continuous, tubular filter media 42 in generally surrounding relation of the standpipe 24 so as to circumscribe the central axis 11. Preferably, the filter element 40 is mounted within the filter housing 12 substantially coaxially to the central axis 11. The filter media 42 may be one of several types of filter media material known in the art formed of an appropriate material in an appropriate manner and adapted for removing impurities from fluid that passes therethrough.

As shown in detail in FIGS. 8-14, the filter element 40 further includes a first (upper) end cap 44 at its upper end, and a second (lower) end cap 46 at its lower end. The end caps 44 and 46 are engaging and supporting in fluid tight relation the ring of filter media 42 at the opposite ends thereof in a conventional manner using potting compound or similar adhesive material. The filter element 40 further includes a center tube 48 extending vertically upward between the second end cap 46 and the first end cap 44. The first end cap 44, the second end cap 46 and the center tube 48 are preferably each formed of an appropriate material (such as plastic) in a conventional manner, such as by molding. Preferably, the center tube 48 is secured to the second end cap 46 by any appropriate manner known in the art, such as adhesive bonding, welding, etc. Alternatively, the center tube 48 is homogenously formed integrally with the second end cap 46 as a single piece unitary member. The center tube 48 has a first end 48a adjacent to the first end cap 44 and a second end 48b adjacent to the second end cap 46. The first end 48a of the center tube 48 has an end wall 56 substantially perpendicular to the central axis 11.

More specifically, as illustrated in detail in FIGS. 1, 8, 9 and 13, the center tube 48 has a first substantially cylindrical side wall portion 50 adjacent to an inner peripheral surface of the filter media 42, and a second substantially cylindrical side wall portion 52 of smaller diameter than the first side wall portion 50. The first side wall portion 50 and the second side wall portion 52 are separated by a middle wall 54 substantially perpendicular to the central axis 11. Furthermore, the first side wall portion 50 is provided with one or more intake holes 51, while the second side wall portion 52 is impervious.

The filter chamber 18 of the filter housing 12 is separated by the filter element 40 into a contaminated, or unfiltered, inlet chamber 18a and a clean, or filtered, exit chamber 18b. As shown in FIG. 1, the inlet chamber 18a is defined between an inner peripheral surface of the filter housing 12 and the filter element 40, while the exit chamber 18b is defined between the filter element 40 and the standpipe 24.

The first end cap 44 is provided with a central hole 45 adapted to receive the first end 48a of the center tube 48 therethrough. An annular resilient seal, or grommet, 58 extends across the central hole 45 in the first end cap 44 to an outer peripheral surface of the second side wall portion 52 of the center tube 48. The second end cap 46 is provided with a central hole 47 through which the standpipe 24 can be inserted longitudinally into the center tube 48. An annular resilient seal, or grommet, 60 extends across the central hole 47 to engage an outer peripheral surface of the standpipe 24. Thus, the seals 58 and 60 seal the exit chamber 18b between the center tube 48 and the standpipe 24 against infiltration of contaminated fluid, as illustrated in FIGS. 1 and 7. The annular seal 60 defines a central opening 61 which is dimensioned to accept the standpipe 24 into the center tube 48.

Furthermore, the center tube 48 includes one or more actuator keys 55 formed integrally therewith and provided to mate with the actuator ring 37 of the flow control valve 32 in the standpipe 24. The actuator keys 55 are sized and arranged complementary to the actuator openings 34b in the closure element 34 so as to extend therethough and engage the actuator arms 38 of the actuator ring 37. Preferably, the actuator keys 55 are homogenously formed integrally with the center tube 48 as a single piece unitary member.

Preferably, the actuator keys 55 are formed in generally evenly-spaced annular arrangement extending downwardly, away from the middle wall 54 into the first side wall portion 50 of the center tube 48 toward the second end 48b thereof. The number and spacing of the actuator keys 55 can vary depending upon the number and location of the actuator openings 34b in the closure element 34, and it is noted that only a single protrusion may be necessary in some applications.

When the filter element 40 is installed in the housing 12, the actuator keys 55 on the center tube 48 project through the actuator openings 34b in the closure element 34 and engage the actuator arms 38 of the actuator ring 37. As the filter element 40 is pressed further toward the closed end 17 of the filter housing 12, the actuator keys 55 force the actuator ring 37 and the closure element 34 axially away from the standpipe seal 39 towards its open position, thereby compressing the spring 35 and opening the inlet openings 30 of the standpipe 24, as shown in FIG. 1, which enable the fluid to be admitted to the internal flow passage 26 of the standpipe 24. The length of the actuator keys 55 necessary to move the actuator ring 37 to an appropriate axial distance in order to open the flow control valve 32 can be easily determined.

It should be appreciated that the filter element 40 without a proper arrangement of the actuator keys 55 will not engage the actuator arms 38 of the actuator ring 37, and the flow control valve 32 will remain closed. It will not be possible to attach the lid 16 to the housing body 14. Thus, the invention not only prevents the operation of the filter assembly 10 without the filter element 40 installed, but also prevents the operation of the filter assembly 10 even if the filter element 40 is installed, but where the filter element 40 fails to have a proper arrangement of actuator keys 55.

Figure 8:
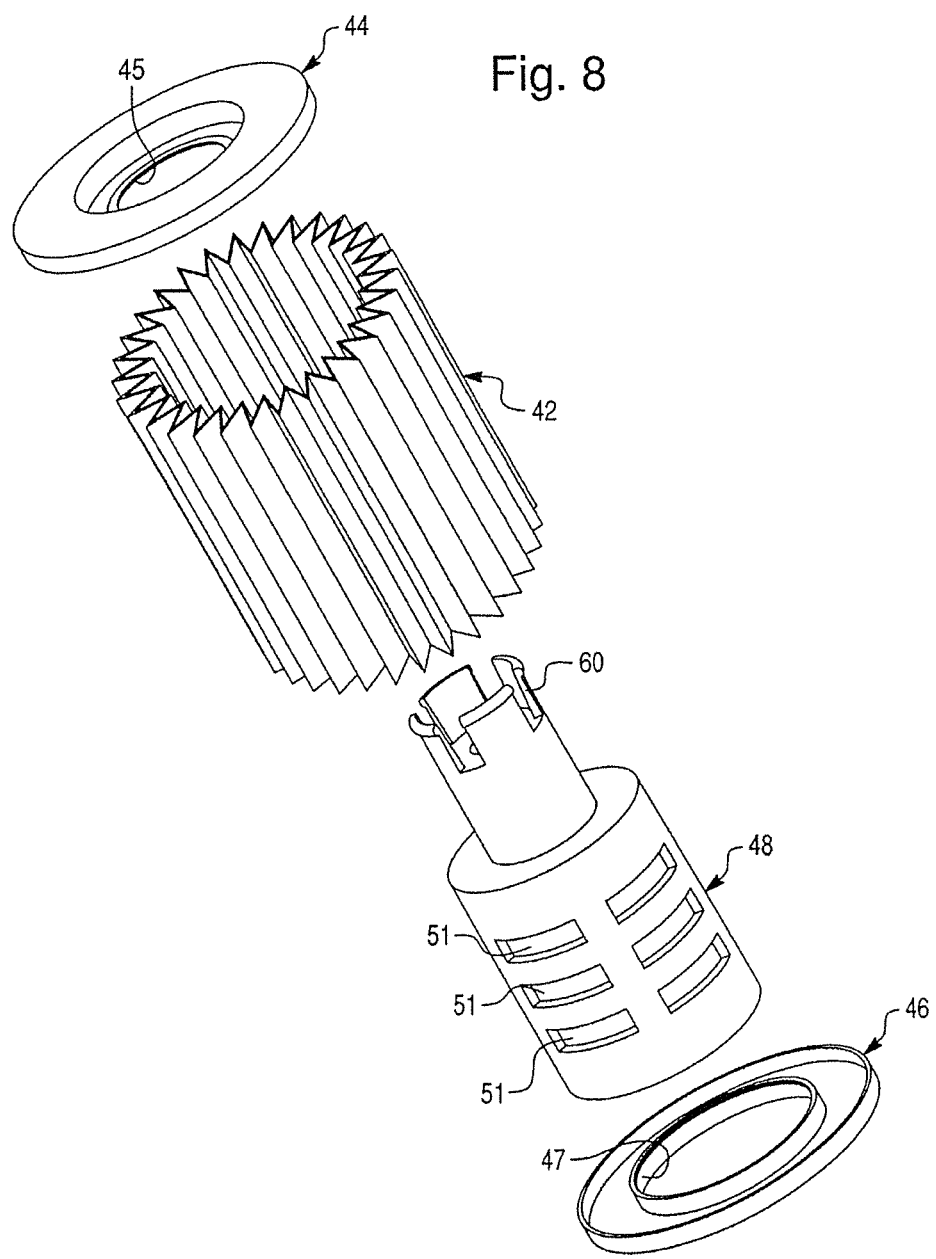
FIG. 8 is an exploded perspective view of a filter element in accordance with the first exemplary embodiment of the present invention.
Figure 9:
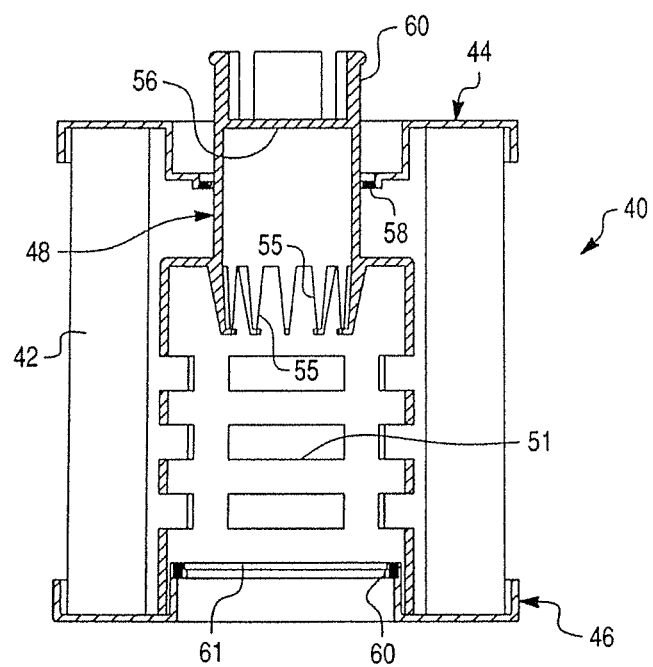
FIG. 9 is a cross-sectional view of the filter element in accordance with the first exemplary embodiment of the present invention.
Figure 10:
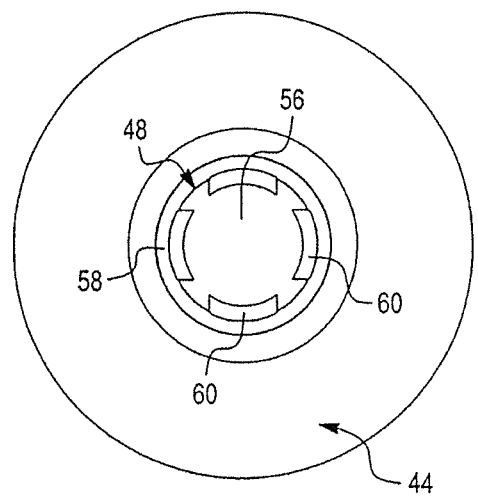
FIG. 10 is a top view of the filter element in accordance with the first exemplary embodiment of the present invention.
Figure 11:
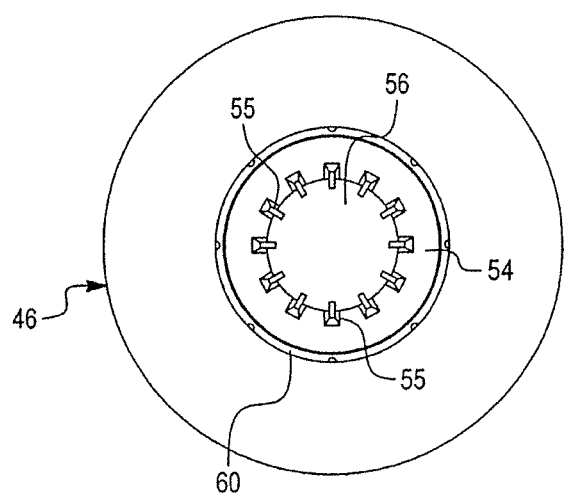
FIG. 11 is a bottom view of the filter element in accordance with the first exemplary embodiment of the present invention.
Figure 12:
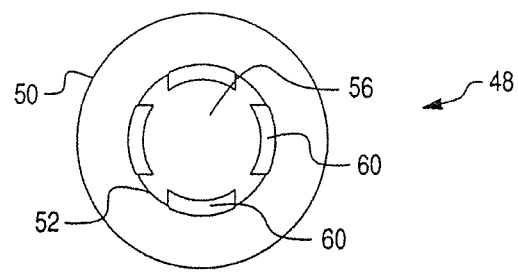
FIG. 12 is a top view of a center tube of the filter element in accordance with the first exemplary embodiment of the present invention.
Figure 13:
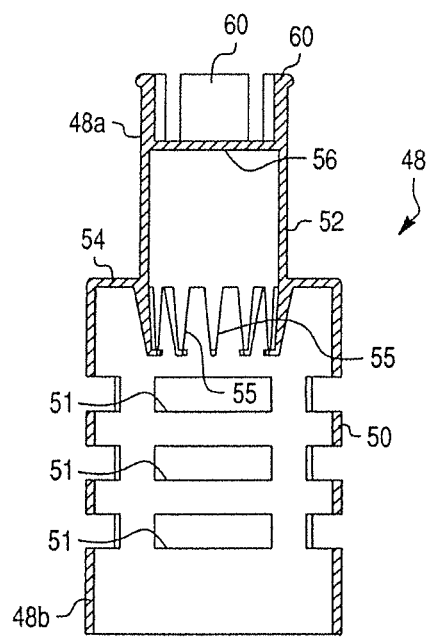
FIG. 13 is a cross-sectional view of the center tube of the filter element in accordance with the first exemplary embodiment of the present invention.
Figure 14:
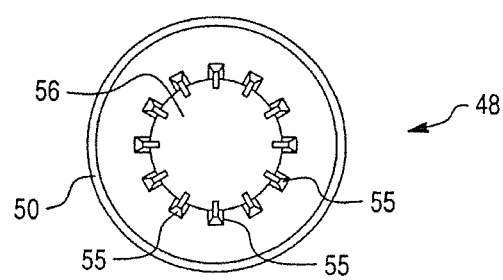
FIG. 14 is a bottom view of the center tube of the filter element in accordance with the first exemplary embodiment of the present invention.

The end wall 56 into the center tube 48 is further provided with a series of distinct, axially-extending flexible fingers, tabs or other elements 60 corresponding to complementary projections 62 formed on an interior cover top wall 64 of the lid 16 (see FIGS. 1 and 2). The fingers 60 are provided for engaging the cover top wall 64 of the lid 16 to retain the filter element 40 to the lid 16 during initial assembly and for pressing the filter element 40 against the biasing force of the main spring 35, as illustrated in FIG. 1. As illustrated in FIGS. 8, 10 and 12, four such fingers 60 are shown in a generally evenly-spaced annular arrangement extending outwardly, away from the end wall 56 of the center tube 48, however the number and spacing of the fingers 60 can vary depending upon the particular structural arrangement of the filter assembly 10, and it is noted that only a single finger 60 may be necessary in some applications. Preferably, both the actuator keys 55 and the fingers 60 are homogenously formed from an appropriate material (such as plastic) unitarily with the center tube 48 as a single piece unitary member in a conventional manner, such as by molding.

In operation of the filter assembly 10, when the filter element 40 is installed properly in the filter housing 12, as illustrated in FIG. 1, the unfiltered (contaminated) fluid flows into the inlet chamber 18a of the filter housing 12 through the inlet port 20. The unfiltered fluid then flows into a portion of the inlet chamber 18a surrounding the filter element 40 and subsequently radially inward through the filter media 42 and the intake holes 51 in the center tube 48 of the filter element 40 in the outside-in flow pattern into the exit chamber 18b and is cleansed of impurities. The clean fluid then travels from the exit chamber 18b into the standpipe 24 through the open flow control valve 32. The filtered fluid leaves the filter housing 12 through the outlet port 22.

When it is desirable to change a spent filter element, the lid 16 is removed (screwed off), and the filter element 40 can be easily accessed and replaced with a fresh filter element. To facilitate the easy grasping of the spent filter element, the flow control valve 32 automatically pushes the spent filter element 40 outwardly a short distance by resilience of the spring 35. This also allows at least some of the fluid to drip off the filter element and remain in the filter housing 12, rather than drip onto the surrounding area during filter element removal.

A new filter element 40 is installed in the housing body 14 by placing the center tube 48 of the new filter element 40 about the standpipe 24. The filter element 40 is then moved downward. Movement of the filter element 40 into the filter chamber 18 causes the actuator keys 55 of the center tube 48 to align with the actuator openings 34b in the closure element 34 so that the actuator keys 55 project through the openings 34b and engage the actuator aims 38 of the actuator ring 37. As the filter element 40 is pressed further toward the closed end 17 of the filter housing 12, the protrusions 55 then force the closure element 34 axially away from the standpipe seal 39, thereby compressing the spring 35. The inner cylindrical wall 34a of the closure element 34 moves axially away from the inlet openings 30 of the standpipe 24, thereby opening the flow control valve 32, as shown in FIGS. 1 and 7. This enables the fluid to be admitted to the internal flow passage 26 of the standpipe 24.

FIGS. 15-27 of the drawings illustrate a second exemplary embodiment of a fluid filter assembly, depicted with the reference numeral 110. Components, which are unchanged from, or function in the same way as in the first exemplary embodiment depicted in FIGS. 1-14 are labeled with the same reference characters. The fluid filter assembly 110 of FIG. 15 substantially corresponds to the fluid filter assembly 10 of FIG. 1, and only the portions, which differ, will therefore be explained in detail below, sometimes without describing detail since similarities between the corresponding parts in the two embodiments will be readily perceived by the reader.

Figure 15:
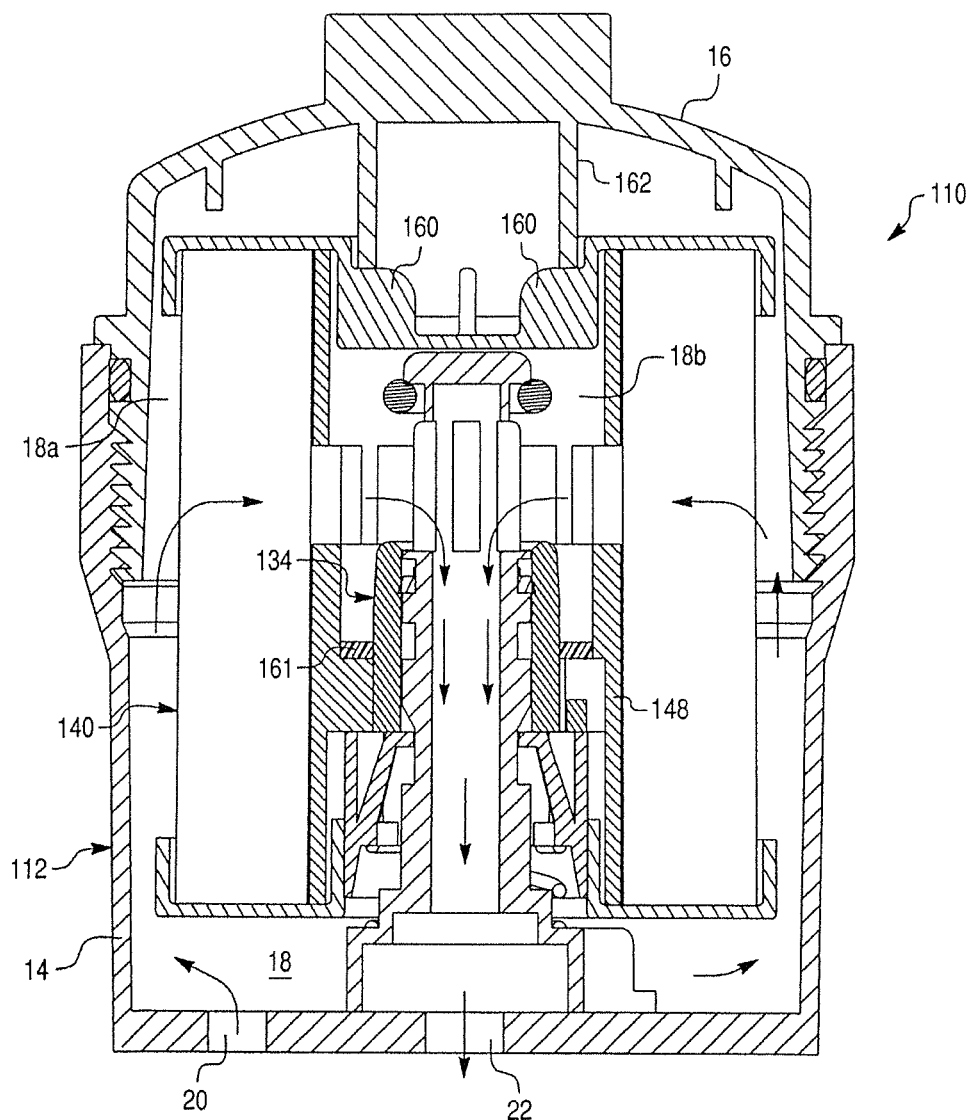
FIG. 15 is a cross-sectional view of a fuel filter assembly in accordance with a second exemplary embodiment of the present invention.

More specifically, according to the second exemplary embodiment of the present invention illustrated in FIG. 15, the fluid filter assembly 110 comprises a filter housing 112 and a replaceable (or disposable) filter element 140 removably mounted within the filter housing 112, the combination of which provides the filter assembly 110.

Figure 16:
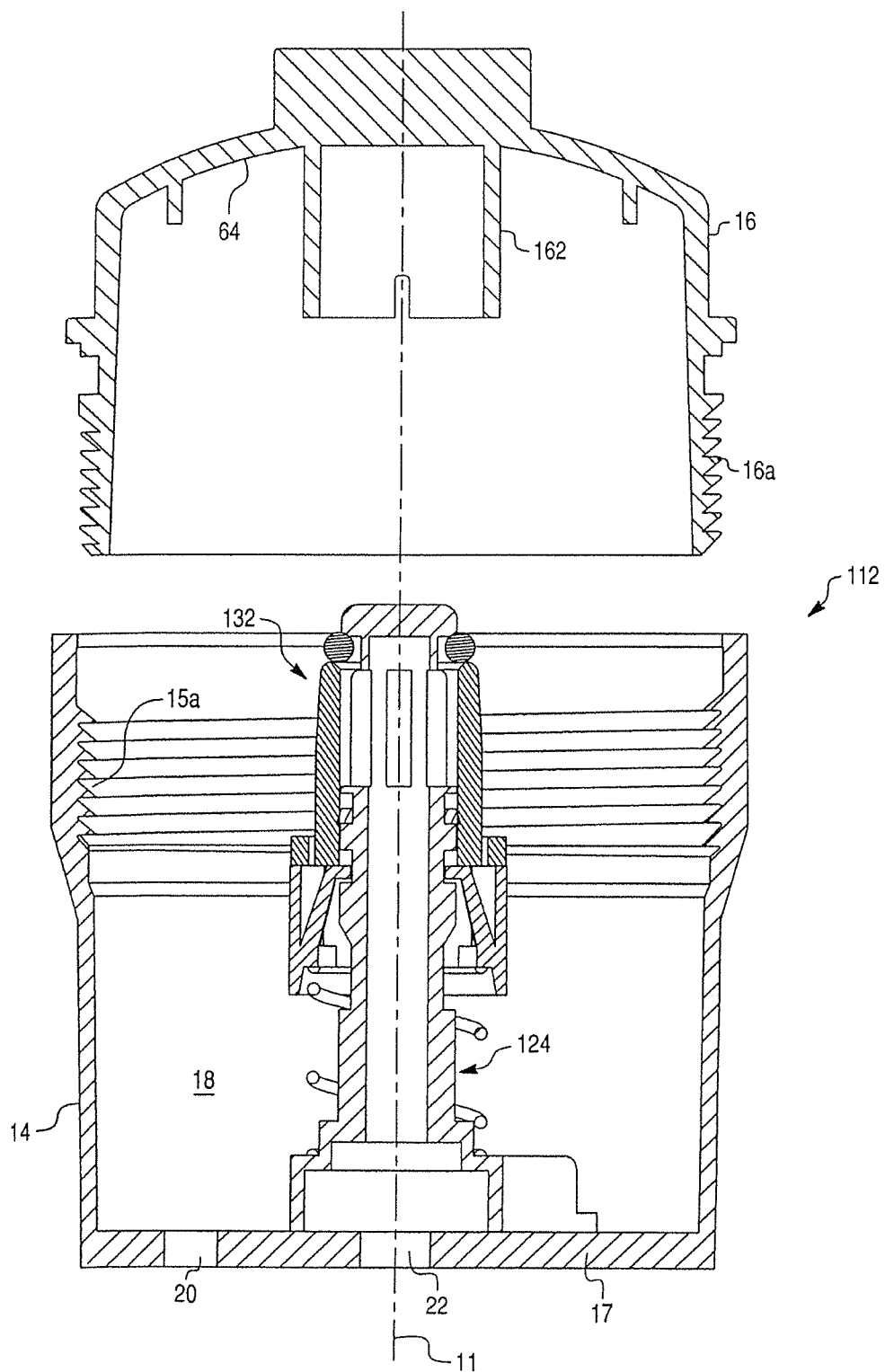
FIG. 16 is a cross-sectional view of a filter housing in accordance with the second exemplary embodiment of the present invention.

The filter housing 112, further illustrated in detail in FIG. 16, is substantially similar to the filter housing according to the first embodiment of the present invention and includes a cup-shaped housing body 14 having a central axis 11 and projecting from a closed end 17 to a distal, open end 15, and a housing lid 16 removably attached to the housing body 14. The filter housing 112, i.e. the housing body 14 and the lid 16, defines a filter chamber (an interior cavity) 18 into which the removable filter element 140 is mounted.

As further illustrated in FIGS. 15 and 16, a standpipe 124 extends vertically upward from a closed end 17 of the filter housing 112 substantially coaxially to a central axis 11.

As illustrated in detail in FIGS. 17-20, the standpipe 124 includes substantially cylindrical standpipe body 125 having an internal flow passage 126 in fluid communication with the outlet port 22, and a flow control valve 132 adjacent to a distal end 128 of the standpipe body 125. The flow control valve 132 is provided for opening and closing the filter chamber 18 of the filter housing 112 to the outlet port 22 depending upon whether or not the filter element 140 has been properly mounted to the filter housing 112. The standpipe body 125 further includes one or more inlet openings 130 provided in a neck portion 129 of the standpipe body 125 foil led adjacent to the distal end 128 thereof in fluid communication with the internal flow passage 126 to allow filtered fluid to pass inward into the internal flow passage 126 of the standpipe 124. Preferably four inlet openings 130 are provided in the neck portion 129 of the standpipe body 125. The standpipe body 125 is sealingly secured to the closed end 17 of the housing body 14 by any appropriate means known in the art, such as by a threaded connection through a mounting flange 127a provided at an inner end 127 of the standpipe body 125. The standpipe body 125 is formed of material, e.g. metal, such as aluminum, or hard plastic, appropriate for the particular application.

The flow control valve 132 includes a closure element 134 mounted for axial movement along the neck portion 129 of the standpipe body 125 and biased by a spring 135 to a closed position for preventing fuel flow into the standpipe 124 through the inlet openings 130. The flow control valve 132 further includes a gasket 136 disposed in a groove 125a in the standpipe body 125 for sealing the closure element 134 against the standpipe body 125, a snap-ring 137 provided with a resilient snap member 138, and a standpipe seal in the form of an O-ring 139. The snap-ring 137 is mounted about the neck portion 129 of the standpipe body 125 between the closure element 134 and the spring 135.

The flow control valve 132 is sized so that the closure element 134 is in close-fitting, movable relation with the neck portion 129 of the standpipe body 125 of the standpipe 124. The closure element 134 is thereby made axially movable about the neck portion 129 of the standpipe body 125 between the closed position illustrated in FIG. 19 and an open position illustrated in FIG. 20. The spring 135 mounted about the standpipe body 125 serves as biasing means for biasing the closure element 134 in the outward direction toward the distal end 128 of the standpipe body 125, i.e. to the closed position of the flow control valve 132. The standpipe body 125 of the standpipe 124 has an annular shelf 125c against which one end of the coil spring 135 bears, while the other end of the coil spring 135 bears against the closure element 134 through the snap-ring 137 to hold the flow control valve 132 in the closed position.

Figure 19:
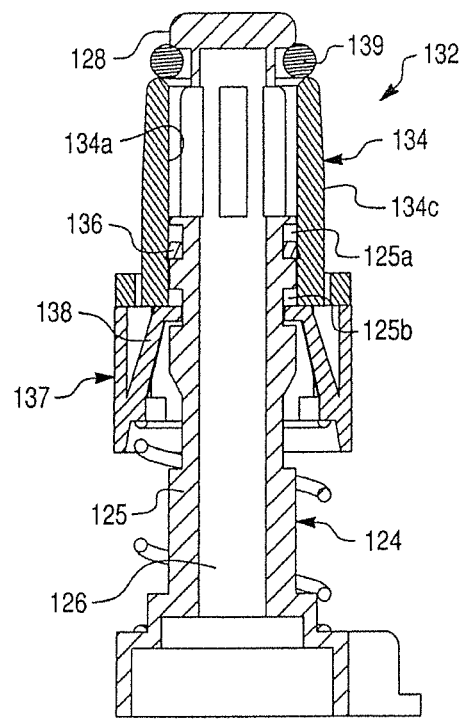
FIG. 19 is a cross-sectional view of the standpipe in accordance with the second exemplary embodiment of the present invention showing the flow control valve in a closed position.

In the closed position of the flow control valve 132, the resilient snap member 138 of the snap-ring 137 engages a groove 125b in the standpipe body 125, as illustrated in detail in FIG. 19. As further illustrated in detail in FIGS. 15, 16, 19 and 20, the closure element 134 has a substantially cylindrical inner wall 134a slidingly engaging the neck portion 129 of the standpipe body 125, a plurality of actuator openings (or actuator slots) 134b at an outer wall 134c thereof for receiving actuator keys of the filter element 140 that axially depresses the closure element 134 and the snap-ring 137 against the bias of the spring 135 to allow fluid flow through the inlet openings 130 past the closure element 134 and into the internal flow passage 126 of the standpipe 124.

The closure element 134, the standpipe 124 and the inlet openings 130 therein operate together as the flow control valve 132 to control fluid communication between the filter chamber 18 inside the filter housing 112 and the internal flow passage 126 of the standpipe 124. When the closure element 134 is disposed in its uppermost (or closed) position juxtaposed to the standpipe seal 139, as shown in FIGS. 16 and 19, the inner wall 134a of the closure element 134 is disposed adjacent and in blocking relation to the inlet openings 130. As a result, the flow control valve 132 is closed and the fluid flow into the standpipe 124 is blocked. However, when the closure element 134 is moved away from the standpipe seal 139 downward to its open position, shown in FIGS. 15, 17 and 20, the inlet openings 130 of the standpipe 124 are open, which enables the fluid to be admitted to the internal flow passage 126 of the standpipe 124. Fluid flows into the internal flow passage 126 of the standpipe 124 through the inlet openings 130, and eventually passes to the fuel outlet port 22 of the filter assembly 110.

The replaceable filter element 140 is removably mounted in the filter chamber 18 of the filter housing 112. The filter element 140 according to the second exemplary embodiment of the present invention illustrated in detail in FIGS. 21-24, includes a ring of a continuous, tubular filter media 142 in generally surrounding relation of the standpipe 124 so as to circumscribe the central axis 11. Preferably, the filter element 140 is mounted within the filter housing 112 substantially coaxially to the central axis 11. The filter media 142 may be one of several types of filter media material known in the art formed of an appropriate material in an appropriate manner and adapted for removing impurities from fluid that passes therethrough.

The filter element 140 further includes a first (upper) end cap 144 at its upper end, and a second (lower) end cap 146 at its lower end. The end caps 144 and 146 are engaging and supporting in fluid tight relation the ring of filter media 142 at the opposite ends thereof in a conventional manner using potting compound or similar adhesive material. The first end cap 144 has an end wall 156 substantially perpendicular to the central axis 11. The second end cap 146 is provided with a central hole 147 through which the standpipe 124 can be inserted longitudinally into the center tube 148.

The filter element 140 further includes a center tube 148 extending vertically upward between the second end cap 146 and the first end cap 144. The first end cap 144, the second end cap 146 and the center tube 148 are preferably each formed of an appropriate material (such as plastic) in a conventional manner, such as by molding. The center tube 148 has a first end 148a adjacent to the first end cap 144 and a second end 148b adjacent to the second end cap 146. Preferably, the center tube 148 is secured to the first and second end caps 144 and 146 by any appropriate manner known in the art, such as adhesive bonding, welding, etc. Furthermore, as illustrated in detail in FIGS. 21 and 26, the center tube 148 has a substantially cylindrical side wall portion 150 adjacent to an inner peripheral surface of the filter media 142. The side wall portion 150 is provided with one or more intake holes 151.

The filter chamber 18 of the filter housing 112 is separated by the filter element 140 into a contaminated, or unfiltered, inlet chamber 18a and a clean, or filtered, exit chamber 18b. As shown in FIG. 15, the inlet chamber 18a is defined between an inner peripheral surface of the filter housing 112 and the filter element 140, while the exit chamber 18*b* is defined between the filter element 140 and the standpipe 124.

Furthermore, the center tube 148 includes one or more actuator keys 155 formed integrally therewith and provided to mate with the closure element 134 of the flow control valve 132 in the standpipe 124. The actuator keys 155 are sized and arranged complementary to the actuator slots 134*b* so as to extend therethough and engage the closure element 134. Preferably, the actuator keys 155 are homogenously formed integrally with the center tube 148 as a single piece unitary member.

Preferably, the actuator keys 155 are formed in generally evenly-spaced annular arrangement extending downwardly, away from the first end 148*a* of the center tube 148 toward the second end 148*b* thereof. The number and spacing of the actuator keys 155 can vary depending upon the number and location of the actuator slots 134*b* in the closure element 134, and it is noted that only a single protrusion may be necessary in some applications.

When the filter element 140 is installed in the housing 112, the actuator keys 155 on the of the center tube 148 project through the actuator openings 134*b* and engage the closure element 134. As the filter element 140 is pressed further toward the closed end 17 of the filter housing 112, the actuator keys 155 force the closure element 134 axially away from the standpipe seal 139, thereby compressing the spring 135 and opening the inlet openings 130 of the standpipe 124, as shown in FIG. 15, which enable the fluid to be admitted to the internal flow passage 126 of the standpipe 124. At the same time, the resilient snap member 138 of the snap-ring 137 snaps out of the groove 125*b* in the standpipe body 125, as illustrated in FIG. 14B. The length of the actuator keys 155 necessary to move the closure element 134 to an appropriate axial distance in order to open the flow control valve 132 can be easily determined.

It should be appreciated that the filter element 140 without a proper arrangement of the actuator keys 155 will not engage the actuator openings 134*b* of the closure element 134, and the flow control valve 132 will remain closed. It will not be possible to attach the lid 16 to the housing body 14. Thus, the invention not only prevents the operation of the filter assembly 110 without the filter element 140 installed, but also prevents the operation of the filter assembly 110 even if the filter element 140 is installed, but where the filter element 140 fails to have a proper arrangement of actuator keys 155.

Figure 23:
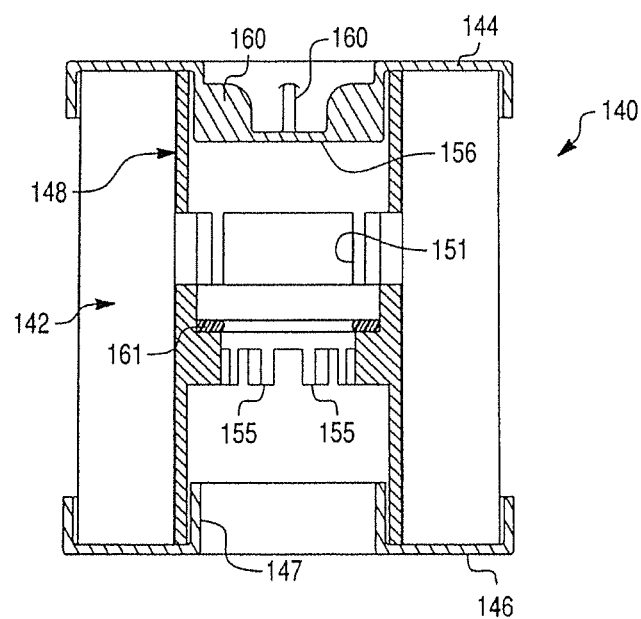
FIG. 23 is a cross-sectional view of the filter element in accordance with the second exemplary embodiment of the present invention.
Figure 24:
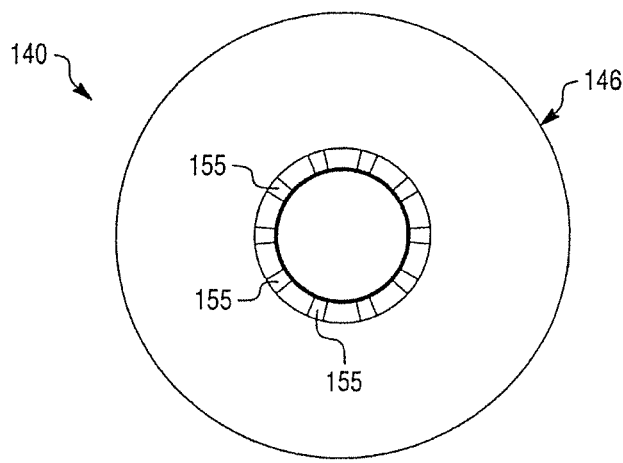
FIG. 24 is a bottom view of the filter element in accordance with the second exemplary embodiment of the present invention.
Figure 25:
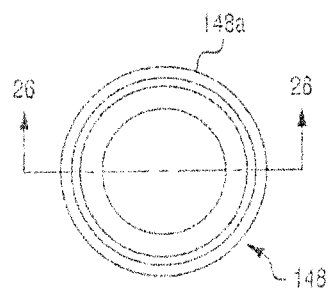
FIG. 25 is a top view of a center tube of the filter element in accordance with the second exemplary embodiment of the present invention.
Figure 26:
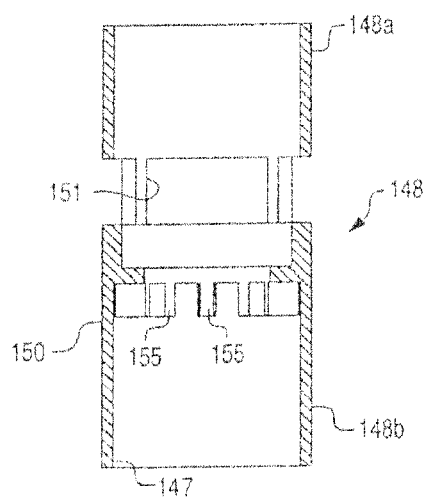
FIG. 26 is a cross-sectional view of the center tube of the filter element in accordance with the second exemplary embodiment of the present invention.
Figure 27:
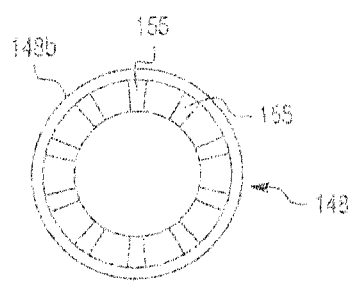
FIG. 27 is a bottom view of the center tube of the filter element in accordance with the second exemplary embodiment of the present invention.

Moreover, the filter element 140 includes an annular resilient seal 161 shown in FIG. 23. The seal 161 is supported by the center tube 148 and lays adjacent and axially opposite the actuator keys 155. The seal 161 is provided to seal the center tube 148 of the filter element 140 against the outer wall 134*c* of the closure element 134, as illustrated in FIG. 15. In other words, the seal 161 fluidly separates the exit chamber 18*b* from the inlet chamber 18*a* of the filter housing 112.

Figure 22:
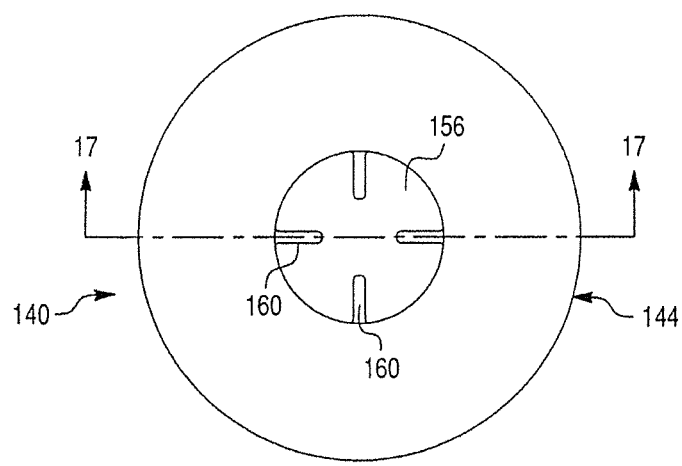
FIG. 22 is a top view of the filter element in accordance with the second exemplary embodiment of the present invention.

The end wall 156 into the first end cap 144 is further provided with a series of distinct, axially-extending flexible fingers, tabs or other elements 160 corresponding to complementary projections 162 formed on an interior cover top wall 64 of the lid 16 (see FIGS. 15 and 16). The tabs 160 are provided for engaging the cover top wall 64 of the lid 16 to retain the filter element 40 to the lid 16 during initial assembly and for pressing the filter element 40 against the biasing force of the main spring 135, as illustrated in FIG. 15. As illustrated in FIG. 22, four such tabs 160 are shown in a generally evenly-spaced annular arrangement extending outwardly, away from the end wall 156 of the first end cap 144, however the number and spacing of the tabs 160 can vary depending upon the particular structural arrangement of the filter assembly 10, and it is noted that only a single tab may be necessary in some applications. Preferably, the tabs 160 are homogenously formed from an appropriate material (such as plastic) unitarily with the first end cap 144 as a single piece unitary member in a conventional manner, such as by molding.

In operation of the filter assembly 110, when the filter element 140 is installed properly in the filter housing 112, as illustrated in FIG. 15, the unfiltered (contaminated) fluid flows into the inlet chamber 18*a* of the filter housing 112 through the inlet port 20. The unfiltered fluid then flows into a portion of the inlet chamber 18*a* surrounding the filter element 140 and subsequently radially inward through the filter media 142 and the intake holes 151 in the center tube 148 of the filter element 140 in the outside-in flow pattern into the exit chamber 18*b* and is cleansed of impurities. The clean fluid then travels from the exit chamber 18*b* into the standpipe 124 through the open flow control valve 132. The filtered fluid leaves the filter housing 112 through the outlet port 22.

When it is desirable to change a spent filter element, the lid 16 is removed (screwed off), and the filter element 140 can be easily accessed and replaced with a fresh filter element. To facilitate the easy grasping of the spent filter element, the flow control valve 132 automatically pushes the spent filter element 140 outwardly a short distance by resilience of the spring 135. This also allows at least some of the fluid to drip off the filter element and remain in the filter housing 112, rather than drip onto the surrounding area during filter element removal.

Figure 17:
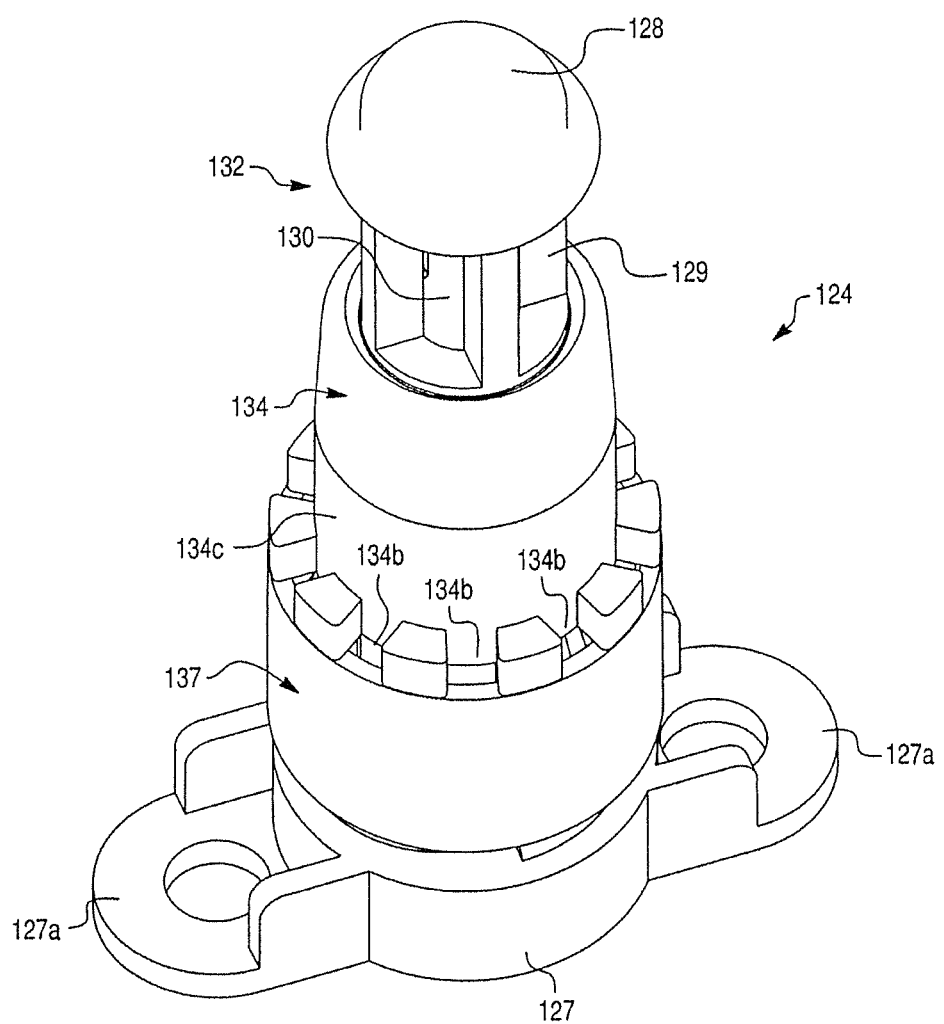
FIG. 17 is a perspective view of a standpipe with a flow control valve in accordance with the second exemplary embodiment of the present invention.
Figure 18:
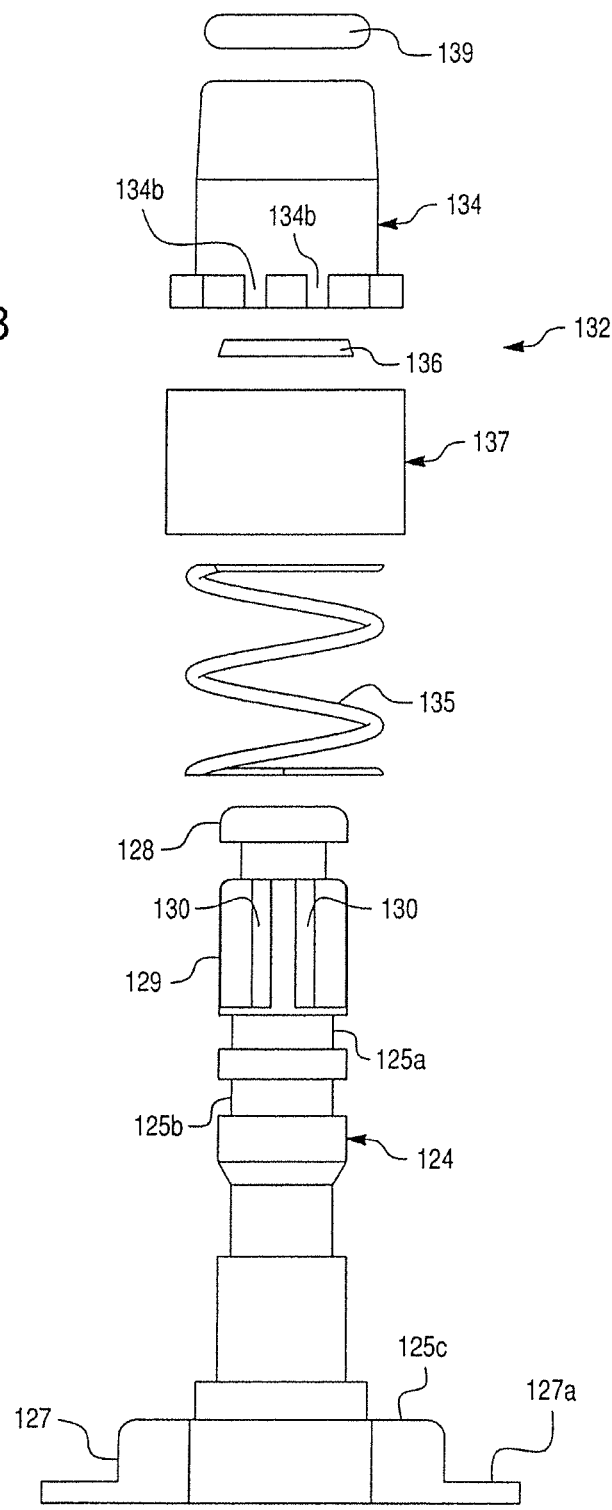
FIG. 18 is an exploded view of the standpipe with the flow control valve in accordance with the second exemplary embodiment of the present invention.
Figure 20:
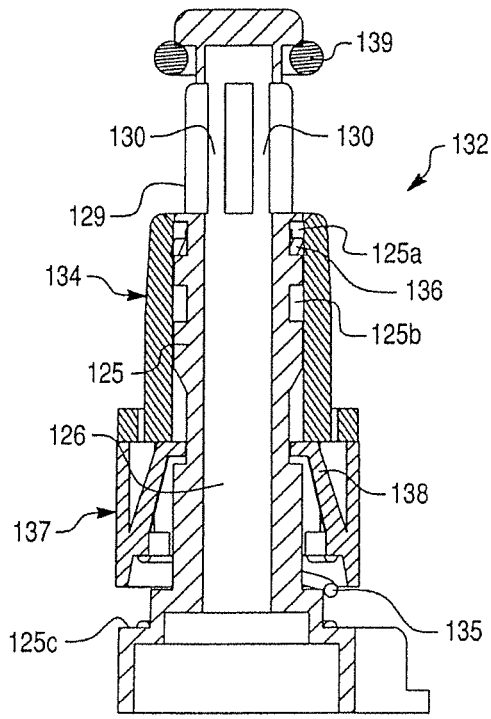
FIG. 20 is a cross-sectional view of the standpipe in accordance with the second exemplary embodiment of the present invention showing the flow control valve in an open position.
Figure 21:
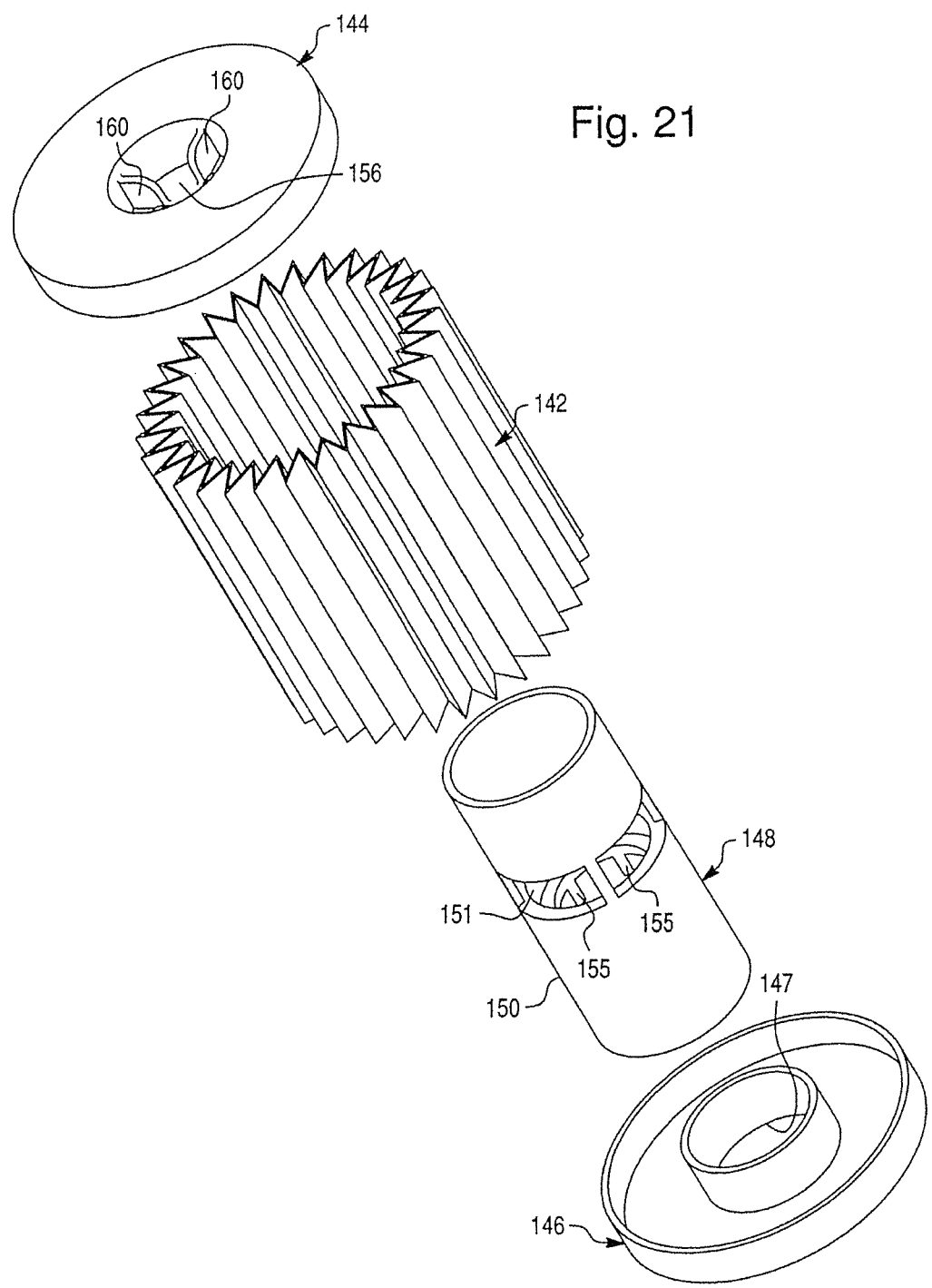
FIG. 21 is an exploded perspective view of a filter element in accordance with the second exemplary embodiment of the present invention.

A new filter element 140 is installed in the housing body 14 by placing the center tube 148 of the new filter element 140 about the standpipe 124. The filter element 140 is then moved downward. Movement of the filter element 140 into the filter chamber 18 causes the actuator keys 155 of the center tube 148 to align with the actuator openings 134*b* in the closure element 134 so that the actuator keys 155 project through the openings 134*b* and engage the closure element 134. As the filter element 140 is pressed further toward the closed end 17 of the filter housing 112, the actuator keys 155 then force the closure element 134 axially away from the standpipe seal 139, thereby compressing the spring 135. The inner wall 134*a* of the closure element 134 moves axially away from the inlet openings 130 of the standpipe 124, thereby opening the flow control valve 132, as shown in FIGS. 15, 17 and 20. This enables the fluid to be admitted to the internal flow passage 126 of the standpipe 124.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A component of a filter element comprising:
a tubular member circumscribing a central axis, said tubular member having a substantially cylindrical body that extends between a first end and a second end, wherein the tubular member defines an axial opening at said second end, a first cylindrical sidewall portion extending substantially parallel to the central axis and defining at least one inlet opening formed therethrough, an impervious second cylindrical sidewall portion extending substantially parallel to the central axis and defining a smaller diameter than the first cylindrical sidewall portion, and a shoulder segment extending substantially perpendicular to the central axis and connecting the first cylindrical sidewall portion to the second cylindrical sidewall portion, wherein an inner side surface of each of the first and second cylindrical sidewall portions defines a passageway extending through the tubular member, a plurality of actuators are annularly arranged upon the shoulder segment, each actuator including an axial portion that extends axially away from a proximal end at an inner surface of the shoulder segment to a distal end disposed within the first cylindrical sidewall portion of the tubular member, and a radial portion that extends radially inwardly from the distal end of each axial portion and is setoff radially inward from the inner surface of the second cylindrical sidewall portion by a distance away from the central axis.

2. The component of the filter element as defined in claim 1, wherein the axial portions of said plurality of actuators longitudinally extend inwardly into said first cylindrical sidewall portion of said tubular member in the direction from said first end toward said second end thereof.

3. The component of the filter element as defined in claim 2, wherein each actuator of said plurality of actuators are evenly spaced apart.

4. The component of the filter element as defined in claim 1, wherein said at least one inlet opening formed through said first cylindrical sidewall portion of said tubular member is radially formed on said body such that fluid can radially enter said tubular member through said at least one inlet opening.

5. The component of the filter element as defined in claim 1, wherein the inner side surface of the first cylindrical sidewall portion defines the passageway extending through the first cylindrical sidewall portion to include a first inner diameter, wherein the inner side surface of the second cylindrical sidewall portion defines the passageway extending through the second cylindrical sidewall portion to include a second inner diameter, wherein the first inner diameter is greater than the second inner diameter.

6. The component of the filter element as defined in claim 1, wherein an outer side surface of the first cylindrical sidewall portion defines the first cylindrical sidewall portion to include a first outer diameter, wherein an outer side surface of the second cylindrical sidewall portion defines the second cylindrical sidewall portion to include a second outer diameter, wherein the first outer diameter is greater than the second outer diameter.

7. The component of the filter element as defined in claim 1, wherein the tubular member extends between a proximal end and a distal end, wherein the first cylindrical sidewall portion extends away from the proximal end, wherein the second cylindrical sidewall portion extends away from the distal end, wherein the tubular member further comprises: an end wall extending across the distal end of the second cylindrical sidewall portion, wherein the proximal end defines a proximal end opening that permits axial access to the passageway, wherein the end wall prohibits access to the passageway from the distal end.

8. The component of the filter element as defined in claim 7 further comprising:
a plurality of axially-extending flexible tabs extending away from the end wall.

9. A filter element removably positionable within a filter housing, the filter housing including a standpipe with a flow control valve, the filter element comprising:
a tubular filter media circumscribing a central axis;
a first end cap connected to said filter media at one end thereof;
a second end cap longitudinally spaced from said first end cap and connected to said filter media at the opposite end thereof; and
a center tube extending between said second end cap and said first end cap, said center tube having a substantially cylindrical body extending between opposite first and second ends of said center tube, said center tube disposed about said standpipe substantially coaxially with said central axis and having a standpipe opening at said second end thereof adjacent to said second end cap through which the standpipe is inserted longitudinally into said center tube when the filter element is installed within the housing, wherein said center tube is further defined by a first cylindrical sidewall portion extending substantially parallel to the central axis and defining at least one inlet opening formed therethrough, an impervious second cylindrical sidewall portion extending substantially parallel to the central axis and defining a smaller diameter than the first cylindrical sidewall portion, and a shoulder segment extending substantially perpendicular to the central axis and connecting the first cylindrical sidewall portion to the second cylindrical sidewall portion, wherein an inner side surface of each of the first and second cylindrical sidewall portions defines a passageway extending through the center tube, wherein said center tube includes a plurality of actuators annularly arranged on the shoulder segment to actuate the flow control valve of the standpipe, each actuator including an axial portion that extends axially away from a proximal end at an inner surface of the shoulder segment to a distal end disposed within the first cylindrical sidewall portion of the tubular member, and a radial portion that extends radially inwardly from the distal end of each axial portion and is setoff radially inward from the inner surface of the second cylindrical sidewall portion by a distance away from the central axis.

10. The filter element as defined in claim 9, wherein said at least one inlet opening formed through said first cylindrical sidewall portion of said center tube is radially formed on said cylindrical body such that fluid can radially enter said center tube through said at least one inlet opening.

11. The filter element as defined in claim 9, wherein the inner side surface of the first cylindrical sidewall portion defines the passageway extending through the first cylindrical sidewall portion to include a first inner diameter, wherein the inner side surface of the second cylindrical sidewall portion defines the passageway extending through the second cylindrical sidewall portion to include a second inner diameter, wherein the first inner diameter is greater than the second inner diameter.

12. The filter element as defined in claim 9, wherein an outer side surface of the first cylindrical sidewall portion defines the first cylindrical sidewall portion to include a first outer diameter, wherein an outer side surface of the second cylindrical sidewall portion defines the second cylindrical sidewall portion to include a second outer diameter, wherein the first outer diameter is greater than the second outer diameter.

13. The filter element as defined in claim 9, wherein the center tube extends between a proximal end and a distal end, wherein the first cylindrical sidewall portion extends away from the proximal end, wherein the second cylindrical sidewall portion extends away from the distal end, wherein the center tube further comprises:
   an end wall extending across the distal end of the second cylindrical sidewall portion, wherein the proximal end defines a proximal end opening that permits axial access to the passageway, wherein the end wall prohibits access to the passageway from the distal end.

14. The filter element as defined in claim 13 further comprising:
   a plurality of axially-extending flexible tabs extending away from the end wall, wherein the plurality of axially-extending flexible tabs correspond to a plurality of corresponding projections formed on an interior cover top wall of a lid for engaging the cover top wall of the lid to retain the filter element to the lid during initial assembly and for pressing the filter element against a biasing force of a main spring.

* * * * *